(12) United States Patent
Smith et al.

(10) Patent No.: US 9,238,479 B2
(45) Date of Patent: Jan. 19, 2016

(54) STEERING SYSTEM WITH DYNAMIC SLIP REDUCTION

(75) Inventors: Stephen Darrell Smith, Plymouth, MN (US); Aaron K. Krahn, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 1228 days.

(21) Appl. No.: 13/111,212

(22) Filed: May 19, 2011

(65) Prior Publication Data

US 2011/0283694 A1 Nov. 24, 2011

Related U.S. Application Data

(60) Provisional application No. 61/347,326, filed on May 21, 2010.

(51) Int. Cl.
*B62D 5/097* (2006.01)

(52) U.S. Cl.
CPC ..................... *B62D 5/097* (2013.01)

(58) Field of Classification Search
CPC ..................................................... B62D 5/097
USPC ...... 60/384, 385, 468, 494; 91/375 A, 375 R; 188/403, 441
See application file for complete search history.

(56) References Cited

U.S. PATENT DOCUMENTS

| 4,759,182 A | 7/1988 | Haarstad |
| 4,838,314 A | 6/1989 | Gage |
| 4,862,690 A * | 9/1989 | Haarstad ........................ 60/384 |
| 5,263,321 A | 11/1993 | Thomsen et al. |
| 5,819,532 A | 10/1998 | Wang et al. |
| 5,970,708 A * | 10/1999 | Bergmann et al. ............. 60/384 |
| 6,318,078 B1 | 11/2001 | Novacek et al. |
| 6,769,249 B2 * | 8/2004 | Novacek ........................ 60/384 |
| 7,028,469 B2 | 4/2006 | Porskrog et al. |

FOREIGN PATENT DOCUMENTS

| DE | 10321109 A1 | 12/2004 |
| EP | 1262393 A2 | 12/2002 |
| JP | 2001163232 A * | 6/2001 |

OTHER PUBLICATIONS

JP2001163232A English machine translation. 2014.*

* cited by examiner

*Primary Examiner* — Edward Look
*Assistant Examiner* — Michael Quandt
(74) *Attorney, Agent, or Firm* — Quinn Law Group, PLLC (57) ABSTRACT

A steering system includes a fluid motor and a steering unit. The steering unit is in fluid communication with the fluid motor. The steering unit includes a fluid meter adapted to meter fluid to the fluid motor in response to actuation of the steering unit. A valve housing is in fluid communication with the fluid meter. The valve housing defines a valve bore. A valve assembly is disposed in the valve bore. The valve assembly defines a primary fluid path to the fluid meter and to the fluid motor from the fluid meter. The valve assembly further defines a secondary fluid path to the fluid motor that bypasses the fluid meter. An amount of fluid through the secondary fluid path is based on volumetric efficiency of the fluid motor.

13 Claims, 11 Drawing Sheets

STEERING SYSTEM WITH DYNAMIC SLIP REDUCTION

CROSS-REFERENCE TO RELATED APPLICATIONS

This application claims the benefit of U.S. Provisional Patent Application Ser. No. 61/347,326, filed on May 21, 2010, the disclosure of which is hereby incorporated by reference.

TECHNICAL FIELD

The present invention generally relates to a steering system configured for attachment to a steering wheel.

BACKGROUND

Steering systems for vehicles allow the operator to turn the vehicle by turning a steering wheel or similar component which turns the wheels of the vehicle. Power steering systems assist the driver in steering the motor vehicle by providing additional force to the steering motion at the wheels.

SUMMARY

A steering system is configured for attachment to a steering wheel. The steering system includes a fluid motor and a steering unit. The steering unit is configured for receiving and expelling fluid. The steering unit is in fluid communication with the fluid motor and includes a fluid meter, a valve housing, and a valve assembly. The fluid meter is configured to meter fluid to the fluid motor in response to actuation of the steering unit. The valve housing is in fluid communication with the fluid meter. The valve housing defines a valve bore. The valve assembly is disposed in the valve bore and is configured for receiving an input from the steering wheel. The valve assembly is moveable between a first open position and a second open position. The valve assembly defines a first variable orifice, a second variable orifice, a third variable orifice, and a fourth variable orifice on a primary fluid path to the fluid meter and to the fluid motor from the fluid meter when the valve assembly is in the second open position. The valve assembly further defines the first variable orifice, the fourth variable orifice, and a bypass orifice on a secondary fluid path to the fluid motor when the valve assembly is in the first open position that bypasses the fluid meter. The bypass orifice is only open to allow fluid to flow therethrough when the valve assembly is in the first open position. Fluid flows through the secondary fluid path in response to input from the steering wheel, as a function of a volumetric inefficiency of the fluid motor.

A steering unit is configured for attachment to a steering wheel and is configured to be in fluid communication with a fluid motor. The steering unit includes a fluid meter, a valve housing, and a valve assembly. The fluid meter is configured to meter fluid to the fluid motor in response to actuation of the steering unit. The valve housing is in fluid communication with the fluid meter. The valve housing defines a valve bore. The valve assembly is disposed in the valve bore and is configured for receiving an input from the steering wheel. The valve assembly defines a primary fluid path to the fluid meter and to the fluid motor from the fluid meter. The valve assembly further defines a secondary fluid path to the fluid motor that bypasses the fluid meter. The valve assembly includes a sleeve and a spool. The sleeve includes an inner surface opposing an outer surface. The inner surface defines a bore that extends along a central longitudinal axis. The sleeve defines a bypass opening. The spool is disposed in the bore of the sleeve and is configured to be rotationally displaced relative to the sleeve, about the central longitudinal axis, to move between a closed position, a first open position, and a second open position in response to input from the steering wheel. The spool defines an inlet slot and a bypass passage. The spool cooperates with the sleeve to define a first and a fourth variable orifice when the spool is in the first open position. The bypass opening of the sleeve overlaps with the inlet slot and the bypass passage to define a bypass orifice located on the secondary fluid path when the spool is in the first open position such that fluid flows through the secondary fluid path to the fluid motor, via the first variable orifice, the fourth variable orifice, and the bypass orifice as a function of a volumetric inefficiency of the fluid motor. The bypass orifice is operatively disposed downstream of the first variable orifice and is operatively disposed upstream of the fourth variable orifice such that fluid is prevented from being communicated to the fluid motor prior to input from the steering wheel. Fluid is prevented from flowing through the secondary fluid path to the fluid motor when the spool is not in the first open position.

A steering system is configured for attachment to a steering wheel. The steering system includes a fluid motor and a steering unit. The steering unit is configured for receiving and expelling fluid. The steering unit is in fluid communication with the fluid motor. The steering unit includes a fluid meter, a valve housing, and a valve assembly. The fluid meter is configured to meter fluid to the fluid motor in response to actuation of the steering unit. The valve housing is in fluid communication with the fluid meter. The valve housing defines a valve bore. The valve assembly is disposed in the valve bore and defines first, second, third, and fourth variable orifices. The valve assembly further defining a bypass orifice. The valve assembly defines a primary fluid path and a secondary fluid path and is movable in response to input from the steering wheel between a closed position, a first open position, and a second open position. The fluid meter and the second and third variable orifices are disposed on the primary fluid path, between the first and fourth variable orifices. The bypass orifice is disposed on the secondary fluid path, between the first and fourth variable orifices. Fluid flows through the bypass orifice, via the secondary fluid path to the fluid motor, when the valve assembly is in the first open position. Fluid flows through the second variable orifice, the fluid meter, and the third variable orifice, via the primary fluid path to the fluid motor, when the valve assembly is in the second open position. The bypass orifice is only open to allow fluid to flow therethrough when the valve assembly is in the first open position, as a function of a volumetric inefficiency of the fluid motor.

The above features and advantages and other features and advantages of the present invention are readily apparent from the following detailed description of the best modes for carrying out the invention when taken in connection with the accompanying drawings.

DETAILED DESCRIPTION

Figure 1:
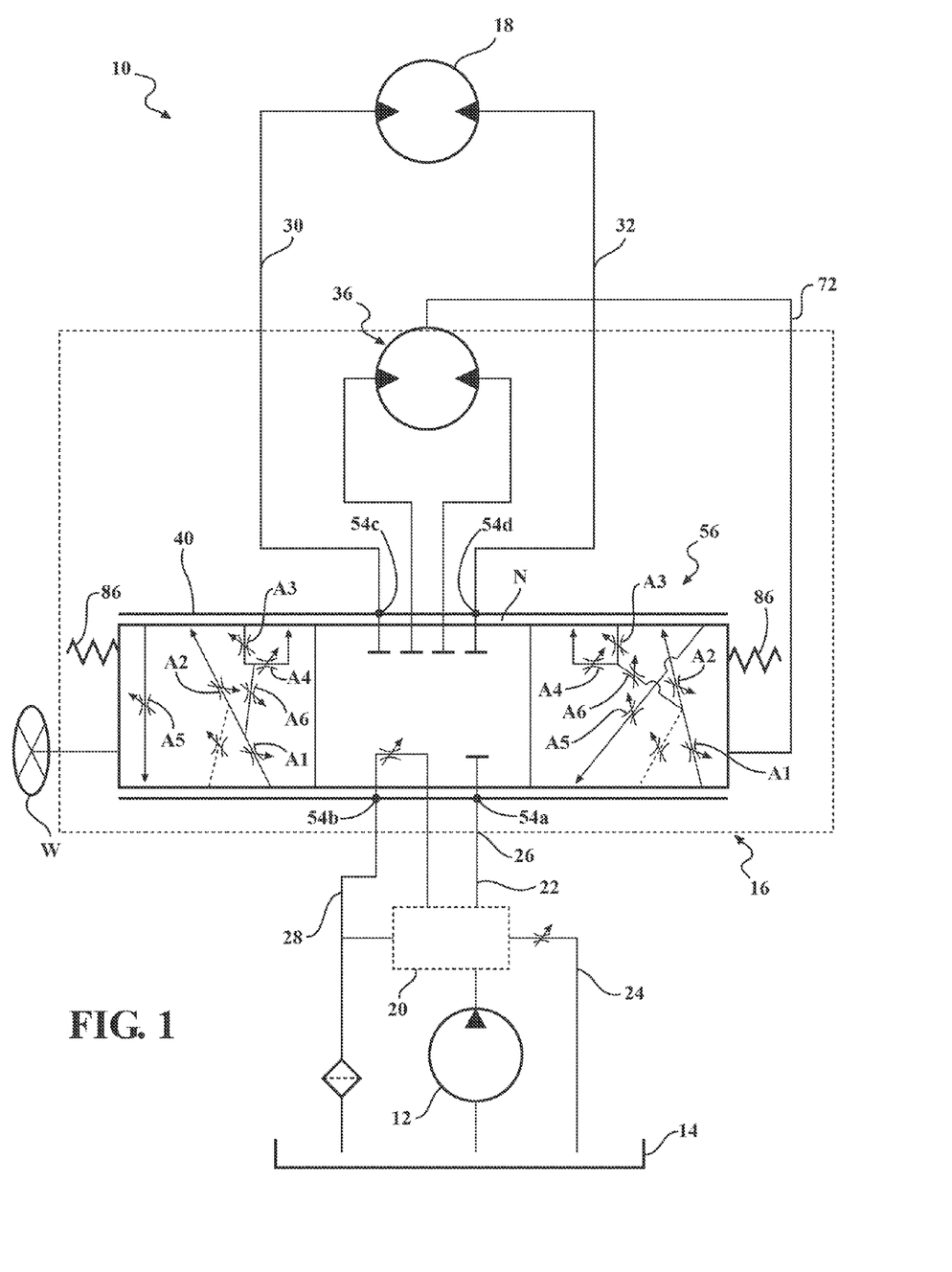
FIG. 1 is a schematic representation of a steering system in accordance with the principles of the present disclosure.

Referring to the Figures, wherein like reference numerals refer to like elements, a steering system is shown at 10 in FIG. 1. The steering system 10 is a hydrostatic steering system that is adapted, i.e., configured, for use on off-highway vehicles (e.g., skid steers, combines, backhoes, etc.). The steering system 10 includes a fluid pump 12 in fluid communication with a fluid reservoir 14 and a steering unit 16 in fluid communication with the fluid pump 12 and a fluid motor 18.

In the depicted embodiment, a priority valve 20 is disposed between the fluid pump 12 and the steering unit 16. The priority valve 20 is adapted to apportion fluid between a first circuit 22, including the steering unit 16 and the fluid motor 18, and a second circuit 24.

The steering unit 16 includes a fluid inlet 26, a fluid outlet 28, a first control port 30 and a second control port 32. The fluid inlet 26 is in fluid communication with the fluid pump 12, while the fluid outlet 28 is in fluid communication with the fluid reservoir 14. The first and second control ports 30, 32 are in fluid communication with the fluid motor 18.

In the depicted embodiment, the fluid motor 18 is a rotary device. It will be understood, however, that the scope of the present disclosure is not limited to the fluid motor being a rotary device as it could be a linear device. The fluid motor 18 is adapted to steer wheels of a vehicle (not shown) in response to fluid provided by the steering unit 16 at a given metered rate that corresponds to the magnitude of rotation of a steering wheel W. In conventional steering systems, volumetric inefficiencies in the fluid motor 18 affect the responsiveness of the fluid motor 18 at low fluid metered rates from a conventional steering unit. These volumetric inefficiencies may be caused by leakage from within the fluid motor 18. The term "slip" or "dynamic slip" is used to describe a condition where a steering device (e.g., steering wheel, joystick, etc.) is actuated but the fluid motor 18 does not move in response to the actuation of the steering device. This lack of movement results when the fluid motor 18 does not receive an adequate supply of fluid upon initial actuation of the steering device. The volumetric inefficiencies are a result of the structure of the fluid motor 18 and, under such conditions when the relatively small fluid flow is sent from the steering unit 16 to the fluid motor 18, the fluid is allowed to leak through the fluid motor 18 without causing the desired rotary motion in the fluid motor 18.

Figure 2:
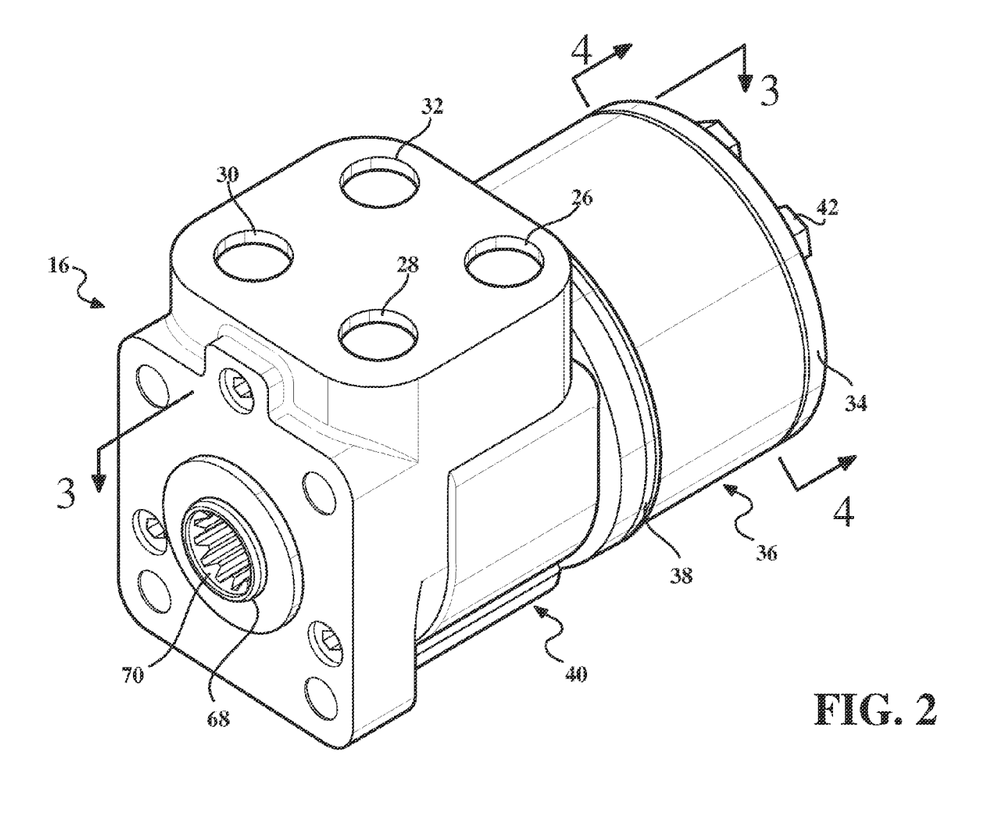
FIG. 2 is an isometric view of a steering unit suitable for use in the steering system of FIG. 1.
Figure 3:
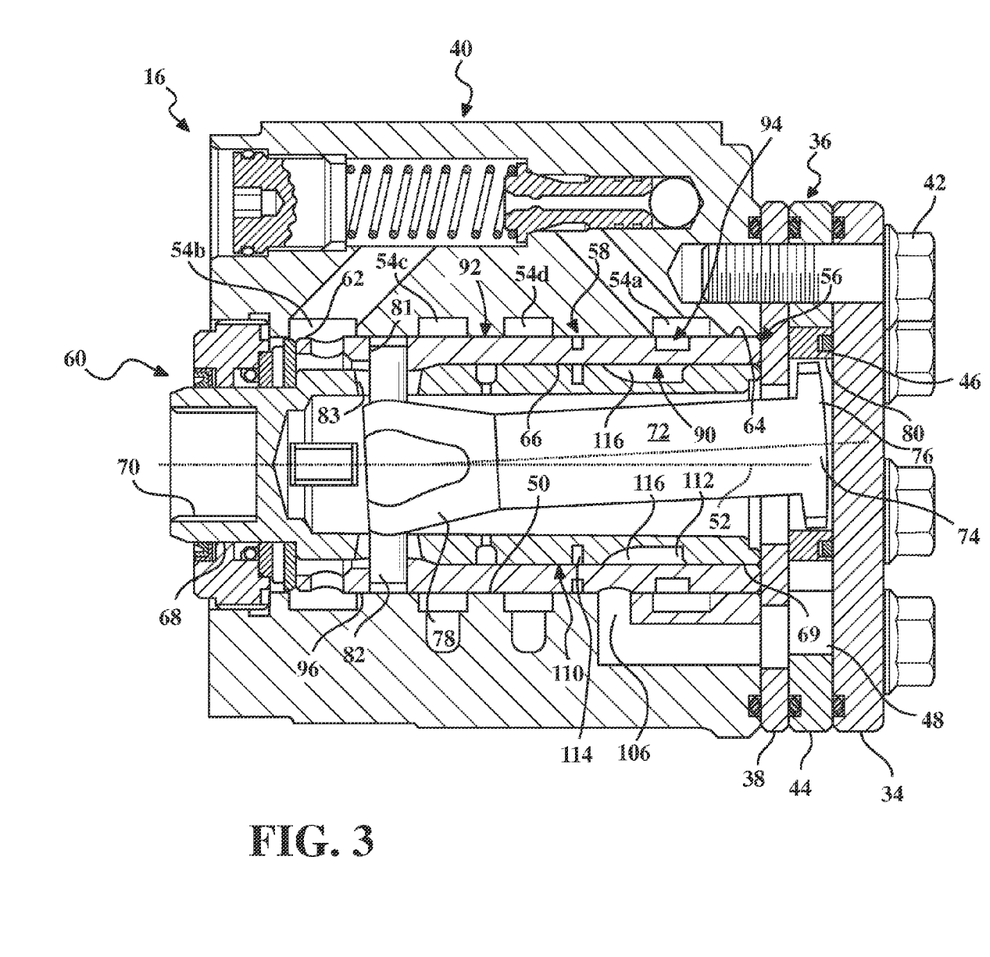
FIG. 3 is a cross-sectional view of the steering unit of FIG. 2, taken along line 3-3.

Referring now to FIGS. 2 and 3, the steering unit 16 is shown. The steering unit 16 is adapted to reduce or eliminate the effect of the volumetric inefficiencies of the fluid motor 18. In the depicted embodiment, the steering unit 16 includes an end plate 34, a fluid meter 36, a port plate 38, and a valve housing 40. A plurality of fasteners 42 (e.g., bolts, etc.) engage and retain the end plate 34, the fluid meter 36, the port plate 38, and the valve housing 40 together.

Figure 4:
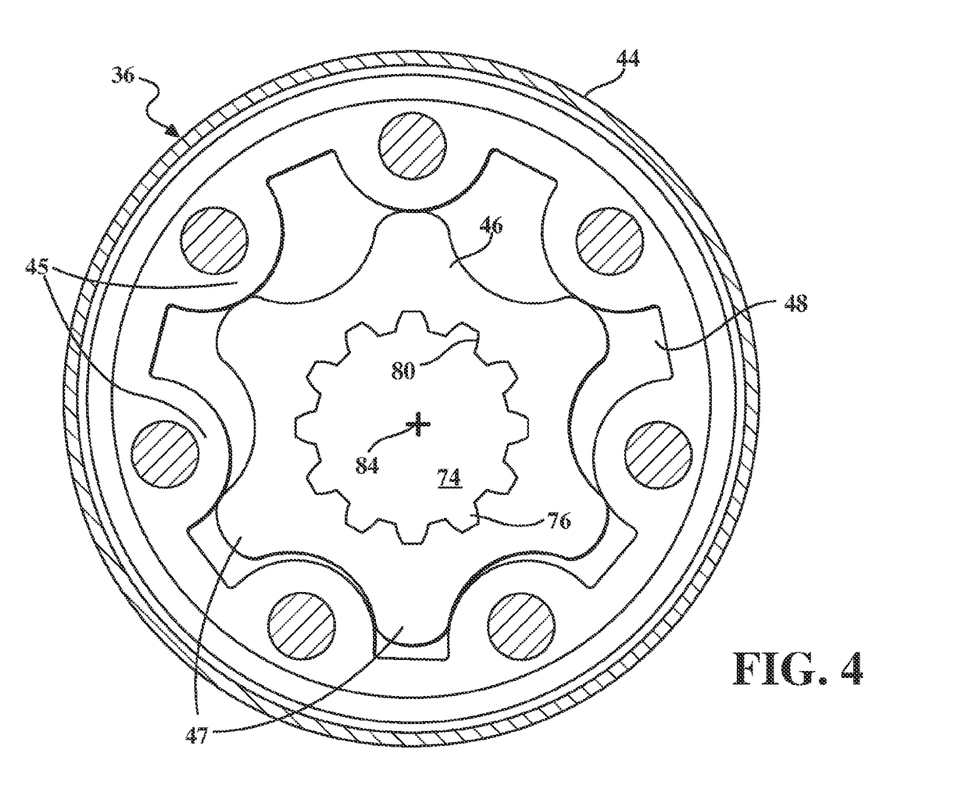
FIG. 4 is view of a fluid meter suitable for use with the steering unit of FIG. 2, taken along line 4-4.

Referring now to FIG. 4, the fluid meter 36 is a gerotor-type fluid meter. The fluid meter 36 includes an internally toothed ring 44 and an externally toothed star 46. The internally toothed ring 44 includes a plurality of internal teeth 45 which are circumferentially disposed. The externally toothed star 46 includes a plurality of external teeth 47, which are circumferentially disposed about the star 46. The internally toothed ring 44 and the externally toothed star 46 cooperatively define a plurality of expanding and contracting volume chambers 48. The number of volume chambers 48 is equal to the number of teeth disposed externally on the star 46 plus at least one. The teeth 47 of the star 46 are adapted to mesh with the teeth 45 of the ring 44 such that the star 46 rotates and orbits within the ring 44, causing the corresponding volume chambers 48 to continuously expand and contract.

Referring now to FIGS. 2 and 3, the valve housing 40 defines the fluid inlet 26, the fluid outlet 28 and the first and second control ports 30, 32. The valve housing 40 further defines a valve bore 50. The valve bore 50 includes a central longitudinal axis 52.

Referring specifically to FIG. 3, the valve housing 40 further defines a plurality of annular grooves 54a, 54b, 54c, 54d that are in fluid communication with the valve bore 50. More specifically, the grooves 54a-54d include a first groove 54a, a second groove 54b, a third groove 54c, and a fourth groove 54d. The first groove 54a is in fluid communication with the fluid inlet 26. The second groove 54b is in fluid communication with the fluid outlet 28. The third groove 54c is in fluid communication with the first control port 30 while the fourth groove 54d is in fluid communication with the second control port 32.

A valve assembly 56 is disposed in the valve bore 50 of the housing 40 of the steering unit 16 so that the valve assembly 56 is selectively rotatable in the valve bore 50. In the depicted embodiment, the valve assembly 56 includes a sleeve 58 and a spool 60. The sleeve 58 is adapted to rotate about the central longitudinal axis 52 of the valve bore 50. The sleeve 58 includes a first end 62 and an oppositely disposed second end 64. The sleeve 58 defines a bore 66 that extends through the first and second ends 62, 64.

The spool 60 is disposed in the bore 66 of the sleeve 58. The spool 60 is adapted to rotate in the bore 66 of the sleeve 58, about the longitudinal axis 52. In the depicted embodiment, the spool 60 includes a first end 68 and a second end 69. The first end 68 of the spool 60 has a reduced diameter and defines a set of internal splines 70 that provide a mechanical interface between the spool 60 and a steering wheel W (shown schematically in FIG. 1).

A main drive 72 is disposed within the spool 60 and mechanically couples the sleeve 58 of the valve assembly 56 to the star 46 of the fluid meter 36. In the depicted embodiment, the main drive 72 includes a first end 74 that includes a plurality of external splines 76 and an oppositely disposed second end 78. The external splines 76 of the first end 74 of the main drive 72 are engaged in meshing relationship with internal splines 80 of the star 46. The second end 78 of the main drive 74 may be bifurcated. The main drive 72 is connected to the sleeve 58 at the second end. More specifically, a pin 82 passes through a pair of circumferentially elongated pin openings 83 defined in the spool 60 and a pair of pin holes 81 defined in the sleeve 58. The circumferentially elongated pin openings 83 have a first diameter D1 and the pin holes 81 have a second diameter D2, which is less than the first diameter. The second diameter D2 pin holes 81 are sized to be small enough such that the pin 82 is retained to the sleeve 58 with limited free movement, i.e., a tightly controlled clearance fit. The first diameter D1 of the pin openings 83 is larger than a diameter of the pin 82. Therefore, the difference between the diameter of the pin 82 and the first diameter D1 of the pin openings 83 allows the spool 60 to be rotationally displaced from the sleeve 58.

In operation, as the steering wheel W is turned, the spool 60 is rotationally displaced from the sleeve 58. This rotational displacement causes pressurized fluid from the fluid pump 12 to flow through the valve assembly 56, and into an expanding volume chamber 48 of the fluid meter 36. As the pressurized fluid enters the expanding volume chamber 48 of the fluid meter 36, the star 46 orbits and rotates about a central axis 84 (shown as a "+" in FIG. 4) of the ring 44. The orbital and rotational movement of the star 46 about the central axis 84 of the ring 44 causes the expanding volume chambers 48 to eventually become contracting volume chambers 48, where the pressurized fluid is expelled from the contracting volume chambers 46 of the fluid meter 36. The expelled pressurized fluid then flows through the valve assembly 54 to the fluid motor 18. The volume or quantity of the pressurized fluid flowing through the fluid meter 36 is metered or otherwise limited by the summation of volumes of the expanding volume chamber 48.

The engagement between the second end 78 of the main drive 72, the pin 82, and the sleeve 58 and the orbital and rotational movement of the star 46 within the ring 44 causes the sleeve 58 to rotate within the valve bore 50 of the valve housing 40. This rotation of the sleeve 58 in the valve bore 50 allows the sleeve 58 to "follow" the rotation of the spool 60, which maintains an appropriate relative rotational displacement between the spool 60 and the sleeve 58. The degree of displacement between the spool 60 and the sleeve 58 corresponds to a rate of rotation of the steering wheel W. For example, at a given rotation rate of the steering wheel W, the spool 60 is rotationally displaced from the sleeve 58 allowing fluid to flow to the fluid motor 18 at a first metered rate. If the rotation rate of the steering wheel W is increased, the rotational displacement of the spool 60 and the sleeve 58 is also increased, allowing fluid to flow to the fluid motor 18 at a second metered rate, where the second metered rate is higher than the first metered rate.

Referring again to FIG. 1, in the subject embodiment, the steering unit 16 further includes a plurality of leaf springs 86 or other biasing devices. The leaf springs 86 act on the sleeve 58 to bias the sleeve 58 toward a neutral position N, relative to the spool 60.

Figure 5:
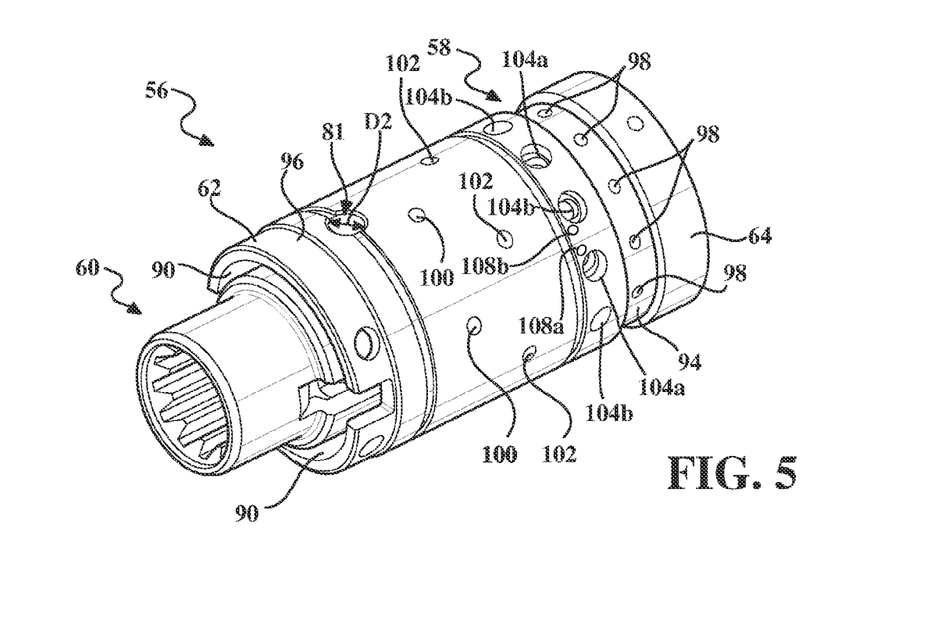
FIG. 5 is an isometric view of a valve assembly suitable for use with the steering unit of FIG. 2.
Figure 6:
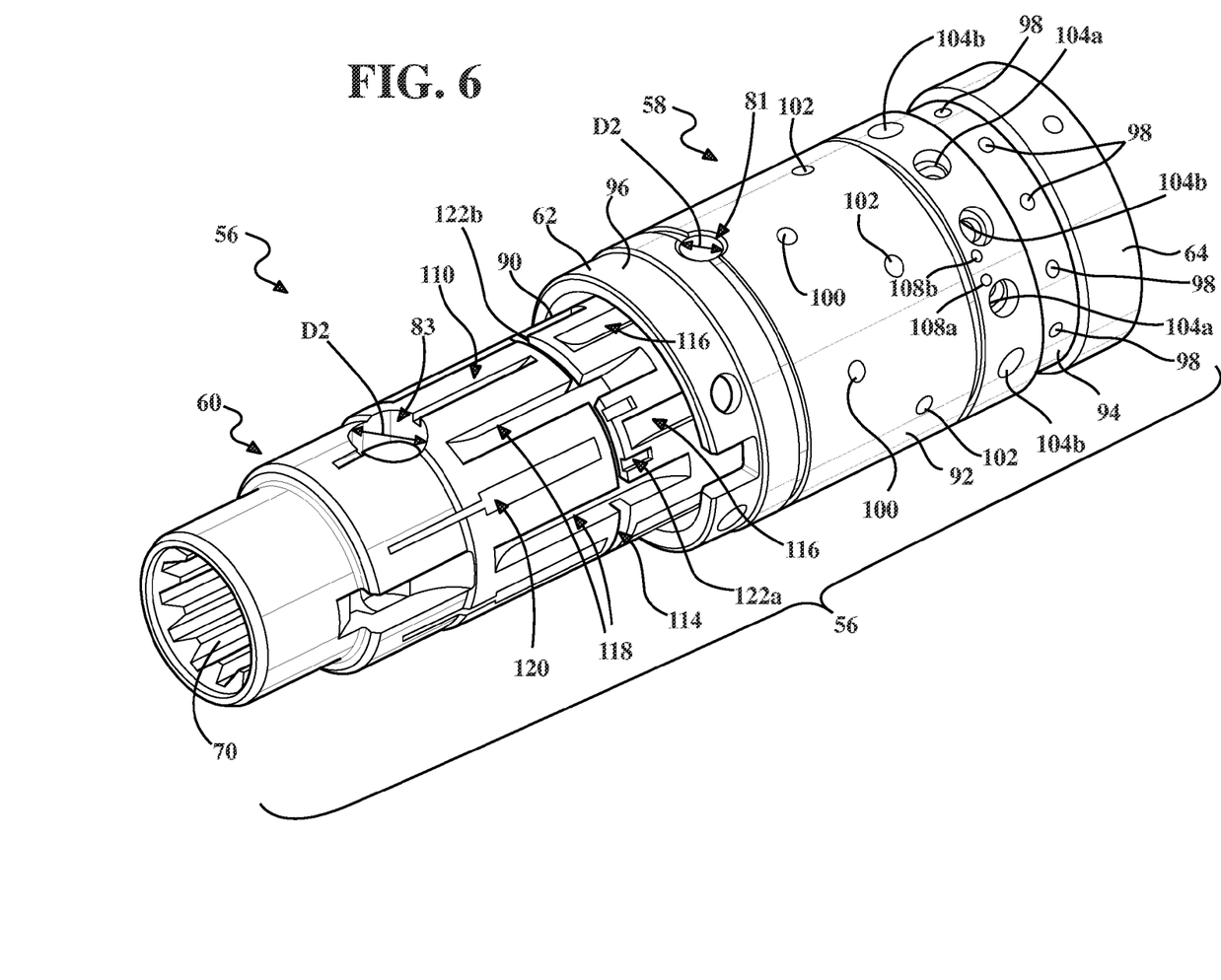
FIG. 6 is an exploded isometric view of the valve assembly of FIG. 5.

Referring now to FIGS. 3, 5, and 6, the valve assembly 56 is shown. The sleeve 58 of the valve assembly 56 includes an inner surface 90 and an outer surface 92, opposing the inner surface 90. The inner surface 90 is adapted to interface with the spool 60 while the outer surface 92 is adapted to interface with the valve bore 50 of the valve housing 40.

Figure 7:
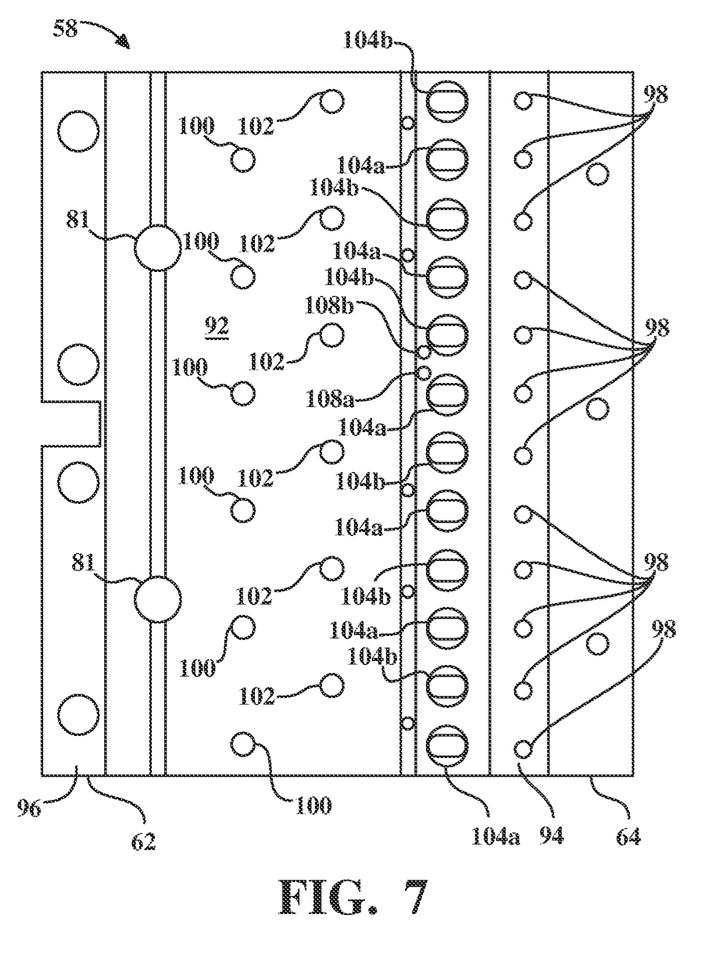
FIG. 7 is a layout view of a sleeve of the valve assembly of FIG. 5.

Referring now to FIGS. 5-7, the sleeve 58 defines an inlet groove 94 and an outlet groove 96. In the depicted embodiment, the inlet groove 94 is axially disposed on the sleeve 58 at a location that is adjacent to the second end 64 of the sleeve 58. The outlet groove 96 is axially disposed on the sleeve 58 at a location that is adjacent to the first end 62 of the sleeve 58.

The inlet and outlet grooves 94, 96 extend circumferentially around the sleeve 58 to form annular grooves. The inlet groove 94 is adapted for fluid communication with the first groove 54a in the valve housing 40. The outlet groove 96 is adapted for fluid communication with the second groove 54b in the valve housing 40.

The sleeve 58 defines a plurality of inlet openings 98 disposed in the inlet groove 94. The inlet openings 98 extend through the inner and outer surfaces 90, 92. In the depicted embodiment, there are twelve inlet openings 98, symmetrically disposed about the sleeve 58.

The sleeve 58 further defines a first plurality of control openings 100 and a second plurality of control openings 102. The first plurality of control openings 100 are axially disposed on the sleeve 58 at a location that is between the inlet and outlet grooves 94, 96 of the sleeve 58. The first plurality of control openings 100 are in fluid communication with the third groove 54c of the valve housing 40. In the depicted embodiment, there are six control openings 100.

The second plurality of control openings 102 are axially disposed on the sleeve 58 at a location that is between the first plurality of control openings 100 and the inlet groove 94. The second plurality of control openings 102 are circumferentially offset from the first plurality of control openings 100. The second plurality of control openings 102 are in fluid communication with the fourth groove 54d of the valve housing 40.

The sleeve 58 further defines a plurality of meter ports 104a, 104b. The meter ports 104a, 104b of the sleeve 58 are adapted for fluid communication with a plurality of radial bores 106 defined in the valve housing 40. In the depicted embodiment, there is one radial bore 106 in the valve housing 40 per each volume chamber 48 of the fluid meter 36. Each radial bore 106 in the valve housing 40 is in fluid communication with one of the volume chambers 48 of the fluid meter 36. The plurality of meter ports 104a, 104b are axially disposed on the sleeve 58 at a location that is between the inlet groove 94 and the second plurality of control openings 102.

The sleeve 58 further defines a first bypass opening 108a and a second bypass opening 108b. The first and second bypass openings 108a, 108b are axially disposed on the sleeve 58 at a location that is between the second plurality of control openings 102 and the plurality of meter ports 104a, 104b. In the depicted embodiment, there are only two bypass openings 108a, 108b. The first and second bypass openings 108a, 108b will be described in greater detail subsequently.

Figure 8:
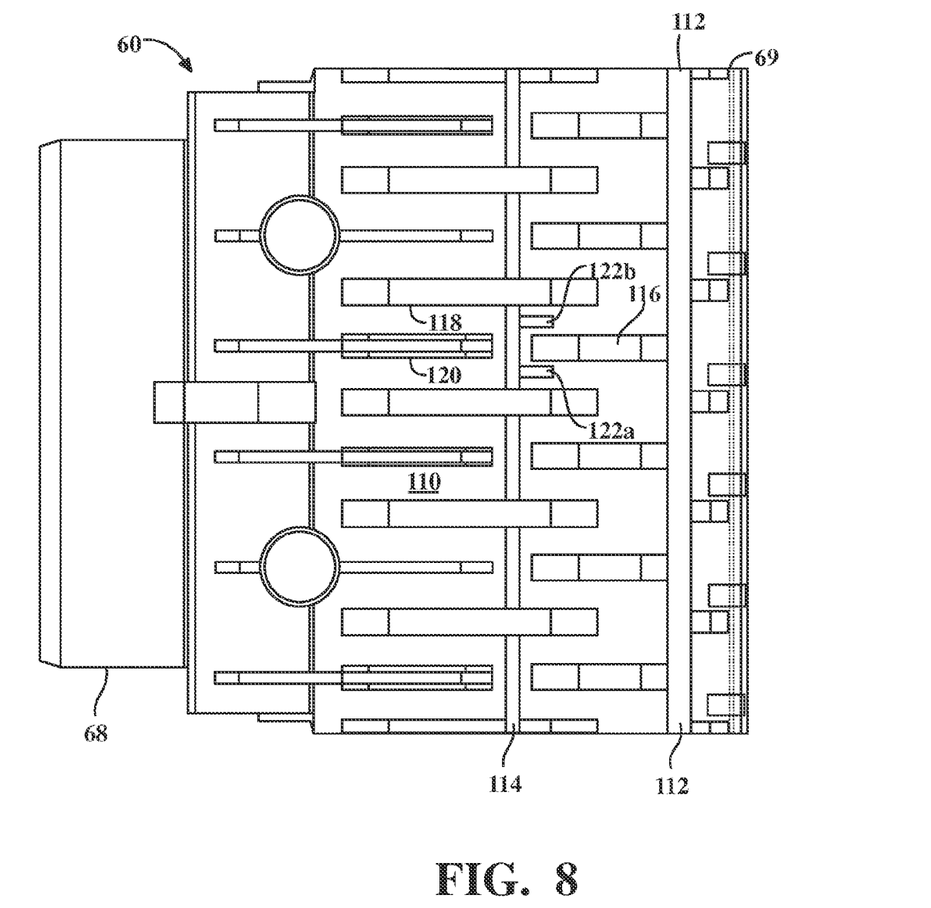
FIG. 8 is a layout view of a spool of the valve assembly of FIG. 5.

Referring now to FIGS. 3, 5, and 8, the spool 60 will be described. The spool 60 includes an exterior surface 110. The exterior surface 110 of the spool 60 defines a first annular groove 112 and a second annular groove 114. The first annular groove 112 is axially disposed on the spool 60 at a location that is adjacent to the second end 69 of the spool 60. The second annular groove 114 is axially disposed on the spool 60 at a location that is between the first end 68 of the spool 60 and the first annular groove 112.

The spool 60 further defines a plurality of inlet slots 116 that are in fluid communication with the first annular groove 112. The inlet slots 116 extend outwardly from the first annular groove 112 in an axial direction toward the first end 68 of the spool 60. The plurality of inlet slots 116 are in fluid communication with the plurality of inlet openings 98 of the sleeve 58 when the spool 60 is rotationally displaced from the sleeve 58.

The spool 60 further defines a plurality of first control slots 118 that are in fluid communication with the second annular groove 114. The plurality of first control slots 118 extend axially along a portion of the spool 60 and are adapted to provide fluid communication between the second meter ports 104b of the sleeve 58 and the first and second plurality of control openings 100, 102 when the spool 60 is rotationally displaced from the sleeve 58. When the spool 60 is rotationally displaced from the sleeve 58 in a first direction (e.g., a clockwise direction), the plurality of first control slots 118 provide fluid communication between the second meter ports 104b and the second plurality of control openings 102 in the sleeve 58. When the spool 60 is rotationally displaced from the sleeve 58 in a second direction (e.g., a counterclockwise direction), the plurality of first control slots 118 provides fluid communication between the second meter ports 104b and the first plurality of control openings 100 in the sleeve 58.

The spool 60 defines a plurality of second control slots 120. The second control slots 120 extend axially along a portion of the spool 60 and are adapted to provide fluid communication between the first and second pluralities of control openings 100, 102 of the sleeve 58 and the second groove 54b of the valve housing 40 when the first or second plurality of control openings 100, 102 are radially aligned with the second control slots 120. The first and second control slots 118, 120 are alternately disposed about the sleeve 58.

The spool 60 further defines a first bypass passage 122a and a second bypass passage 122b. The first and second bypass passages 122a, 122b are in fluid communication with the second annular groove 114. Each of the first and second bypass passages 122a, 122b extend outwardly from the second annular groove 114 in an axial direction toward the second end 69 of the spool 60. The first and second bypass passages 122a, 122b are disposed between two immediately adjacent first control slots 118. In the depicted embodiment, a portion of one of the inlet slots 116 is disposed partly between the first and second bypass passages 122a, 122b. The first and second bypass passages 122a, 122b will be explained in more detail below.

Figure 9:
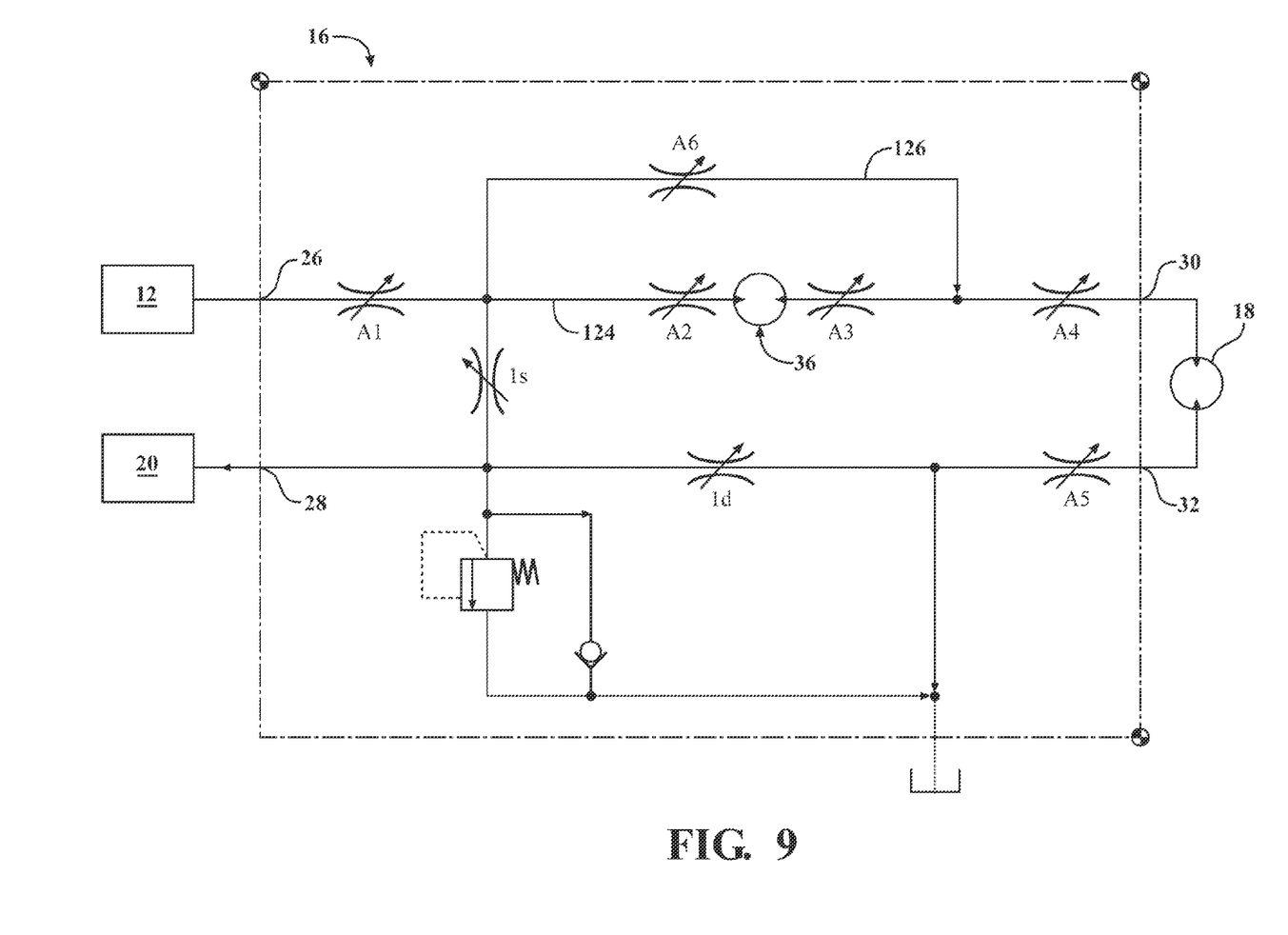
FIG. 9 is a flow diagram of the steering unit of FIG. 2, showing various orifices.

Referring now to FIG. 9, a primary fluid path 124 of the steering system 10 will be described. Fluid from the fluid pump 12 enters the fluid inlet 26 of the steering unit 16. The fluid from the fluid inlet 26 is communicated to the first groove 54a in the valve housing 40. From the first groove 54a, fluid enters the inlet groove 94 of the sleeve 58. Fluid from the inlet groove 94 of the sleeve 58 is communicated to the inlet slots 116 in the spool 60 through first variable orifices A1 (shown in FIG. 9) in the valve assembly 56. The first variable orifices A1 are defined by the overlap between the inlet openings 98 in the sleeve 58 and the corresponding inlet slots 116 in the spool 60. The size of the first variable orifices A1 varies based on the amount of relative rotational displacement between the spool 60 and the sleeve 58. More specifically, as the rotational displacement between the spool 60 and the sleeve 58 increases, the size of each of the first variable orifices A1 increases.

Fluid flowing within the inlet slots 116 defined in the spool 60 then flows through second variable orifices A2 (shown in FIGS. 1, 9, and 12) which are defined by the overlap between the inlet slots 116 of the spool 60 and the first meter ports 104a of the sleeve 58. The size of the second variable orifices A2 varies based on the amount of relative rotational displacement between the spool 60 and the sleeve 58. The fluid flowing out through the first meter ports 104a are then communicated to the corresponding volume chambers 48, which are expanding, through the corresponding radial bores 106 defined in the valve housing 40

As the expanding volume chambers 48, containing the fluid, transforms into the volume chambers 48, which are contracting, fluid from the contracting volume chambers 48 is communicated to the second meter ports 104b through the radial bores 106 in the valve housing 40. The fluid is communicated to the first control slots 118 in the sleeve 58 through third variable orifices A3 (shown in FIGS. 1, 9, and 12) in the valve assembly 56. The third variable orifices A3 are created by the overlap between the second meter ports 104b defined in the sleeve 58 and the first control slots 118 defined in the spool 60, where the overlap results from rotational displacement of the spool 60 relative to the sleeve 58. The size of the third variable orifices A3 varies based on the amount of relative rotational displacement between the spool 60 and the sleeve 58

Referring again to FIGS. 1, 9, and 12, the valve assembly 56 includes a plurality of fourth variable orifices A4 which are defined by an overlap between the first control slots 118 defined in the spool 60 and the first or second plurality of control openings 100, 102 defined in the sleeve 58, where the overlap results from rotational displacement of the spool 60 relative to the sleeve 58. Fluid passing through the fourth variable orifices A4 flows through the third or fourth grooves 54c, 54d, defined in the valve housing 40, and into the fluid motor 18 through the respective first and second control ports 30, 32. The size of the fourth variable orifices A4 varies based on the amount of relative rotational displacement between the spool 60 and the sleeve 58

Figure 12:
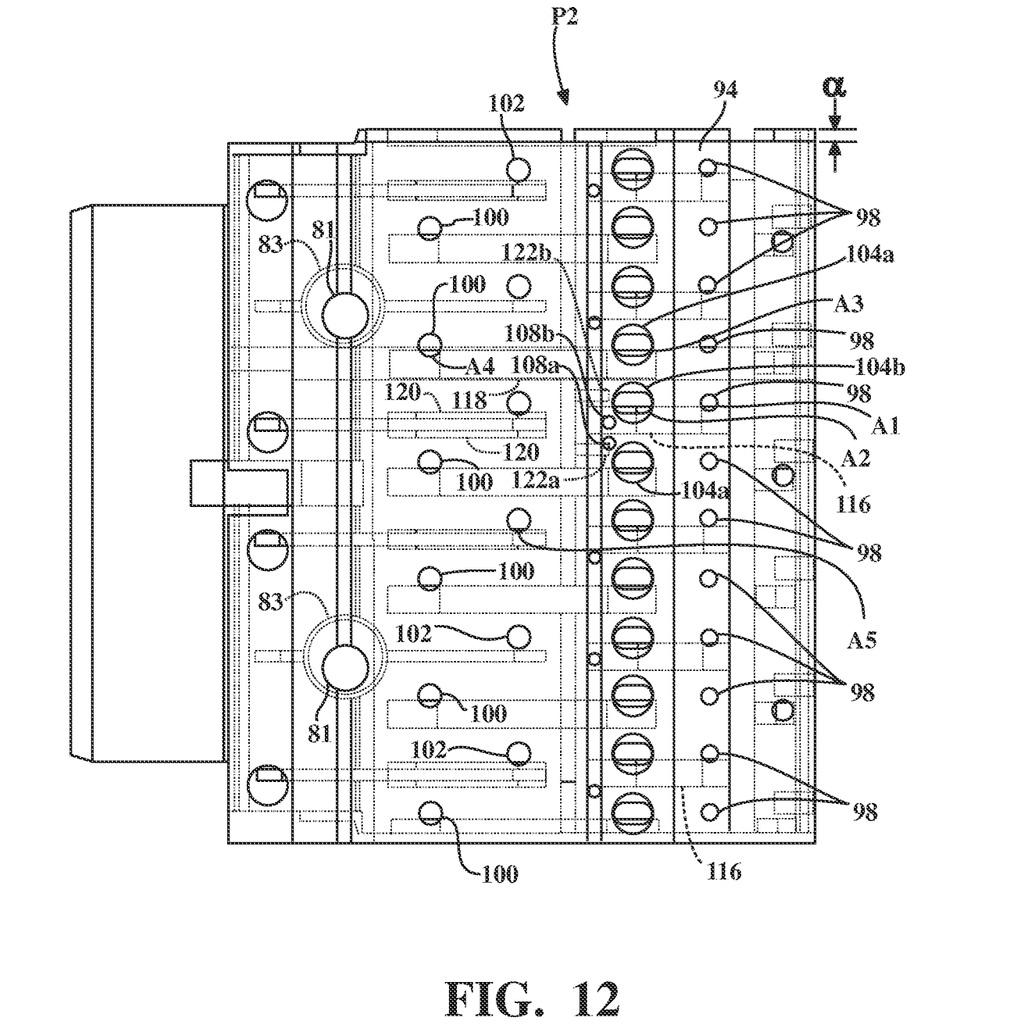
FIG. 12 is an overlay view of the valve assembly of FIG. 5 shown further displaced from the neutral position, in a second open position.

Fluid from the fluid motor 18 is communicated to the second groove 54b defined in the valve housing 40 through a plurality of fifth variable orifices A5 defined in the valve assembly 56 (FIGS. 1, 9, and 12). The fifth variable orifices A5 are defined by an overlap between the first or second plurality of control openings 100, 102 defined in the sleeve 58 and the second control slots 120 defined in the spool 60, where the overlap results from rotational displacement of the spool 60 relative to the sleeve 58. The size of the fifth variable orifices A5 varies based on the amount of relative rotational displacement between the spool 60 and the sleeve 58

Figure 10:
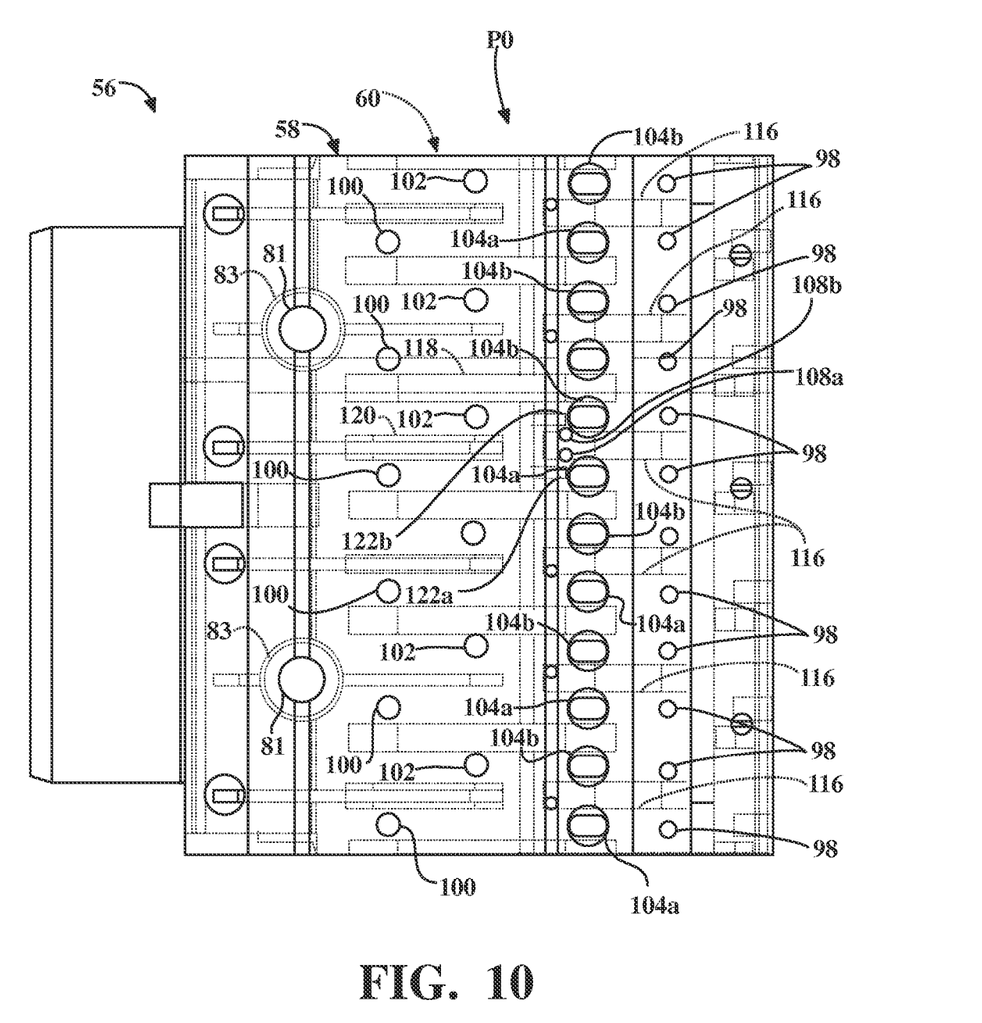
FIG. 10 is an overlay view of the valve assembly of FIG. 5, shown in a neutral position.

When the spool 60 is not rotationally displaced relative to the sleeve 58 (i.e., when the valve assembly 56 is in the neutral position N), the spool 60 is in a closed position P0 and the variable orifices A1-A5 are blocked (best shown in FIGS. 1 and 10). When the spool is rotationally displaced relative to the sleeve 58, the variable orifices A1-A5 begin to open. However, as previously provided, volumetric inefficiencies in the fluid motor 18 make the motor unresponsive to low flow rates (i.e., small rotational displacements between the spool 60 and the sleeve 58). This unresponsiveness of the fluid motor 18 to low flow rates means that when the steering wheel W is rotated at low revolutions per minute, the fluid motor 18 is not actuated.

In order to account for the volumetric inefficiencies in the fluid motor 18, the valve assembly 56 of the steering unit 16 includes a secondary fluid path 126 (shown in FIG. 9) through the steering unit 16. The secondary fluid path 126 provides a path through the valve assembly 56 through which fluid from the fluid inlet 26 is communicated to one of the first and second control ports 30, 32, while bypassing the fluid meter 36. The secondary fluid path 126 provides an amount of fluid, in addition to the fluid provided through the primary fluid path 124 of the valve assembly 56, to the fluid motor 18 at low revolutions per minute of the steering wheel W. The additional amount of fluid flowing through the secondary fluid path 126 of the valve assembly 56 compensates for fluid that bypasses a displacement assembly (e.g., gerotor set, piston assembly, radial piston assembly, cam-lobe assembly, vane assembly, etc.) of the fluid motor 18 to reduce dynamic slip. As the revolutions per minute of the steering wheel W increase, the amount of fluid that passes through the primary fluid path 124 of the valve assembly 56 increases. As the amount of fluid that passes through the primary fluid path 124 increases, the effects of the volumetric inefficiencies of the fluid motor 18 on the steering system 10 are minimized. As a result, the secondary fluid path 126 through the valve assembly 56 closes.

The secondary fluid path 126 is only open at small rotational displacements of the valve assembly 56. In one embodiment, the secondary fluid path 126 is only open when the rotational displacement of the spool 60 relative to the sleeve 58 is less than or equal to about 5°. In another embodiment, the secondary fluid path 126 is only active when the rotational displacement of the spool 60 relative to the sleeve 58 is in a range of about 3° to about 5°. In another embodiment, the secondary fluid path 126 is only active when the rotational displacement of the spool 60 relative to the sleeve 58 is in a range of about 3.7° to about 5°.

Figure 11:
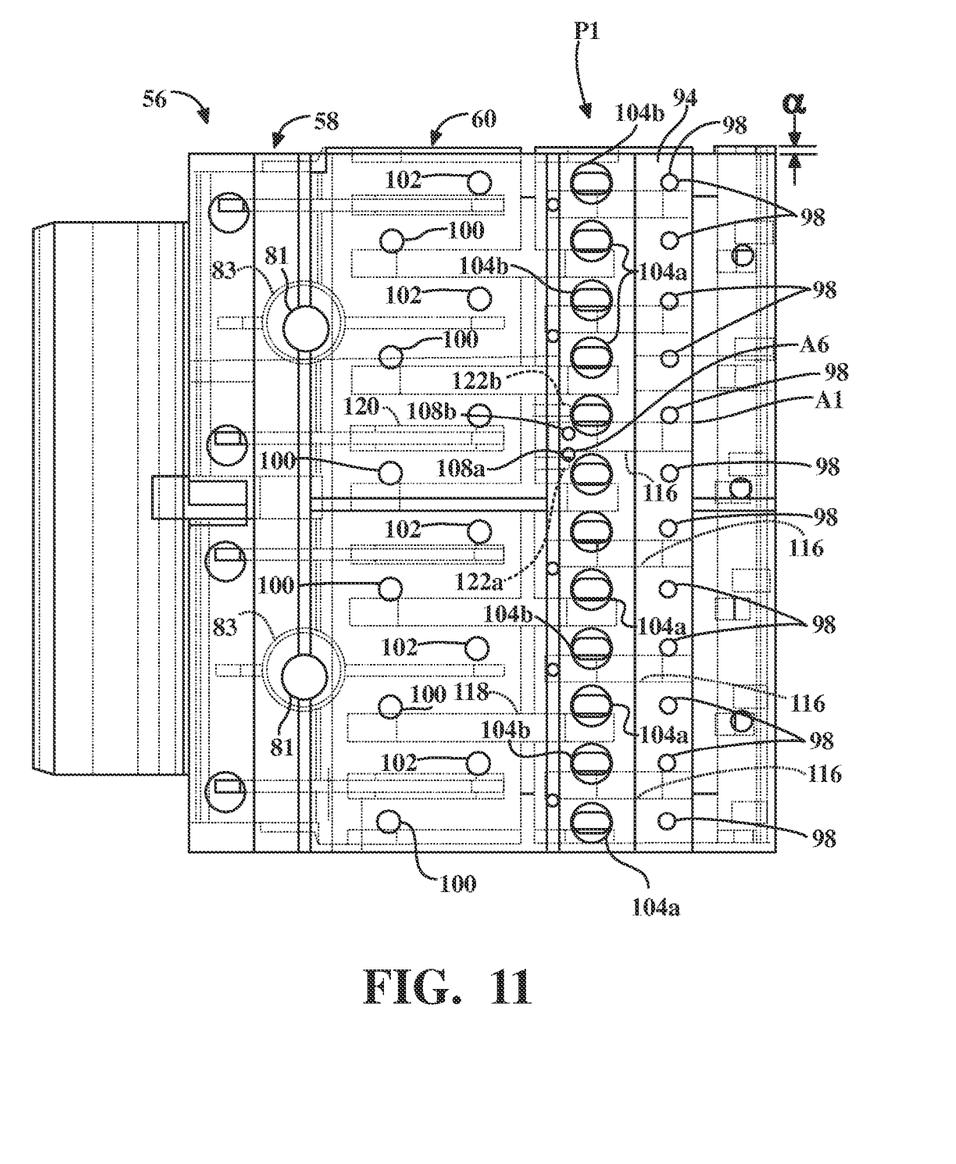
FIG. 11 is an overlay view of the valve assembly of FIG. 5, shown displaced from the neutral position, in a first open position.

Referring now to FIGS. 9 and 11, the secondary fluid path 126 includes a bypass orifice A6, hereinafter referred to as a sixth variable orifice A6, disposed downstream of the first variable orifices A1 and upstream of the fourth variable orifices A4. The disposition of the sixth variable orifice A6 between the first and fourth variable orifices A1, A4 prevents fluid from being communicated to the fluid motor 18 before actuation of the steering wheel W.

The sixth variable orifice A6 provides a path through which fluid bypasses the second and third variable orifices A2, A3 and therefore bypasses the fluid meter 36. The sixth variable orifice A6 provides a direct path from one of the inlet slots 116 to the first control slots 118. In the depicted embodiment, the sixth variable orifice A6 is formed by the overlap between one of the first and second bypass openings 108a, 108b of the sleeve 58 with one of the inlet slots 116 and one of the first and second bypass passages 122a, 122b of the spool 60. The volume of fluid which is permitted to flow through the sixth variable orifice A6 is configured to be sufficient to compensate to the leakage of the corresponding fluid motor 18. The volume of fluid permitted to flow through the sixth variable orifice A6 and into the fluid motor 18 may be configured based on the size of the first and second bypass openings 108a, 108b of the sleeve 58, the size of the inlet slots 116, and/or the size of the first and second bypass passages 122a, 122b of the spool 60. Additionally, the volume of fluid permitted to flow through the sixth variable orifice A6 and into the fluid motor 18 may be influenced by the amount of fluid permitted to through the first variable orifice A1 and/or the fourth variable orifice A4.

Referring to FIG. 11, with the spool 60 rotationally displaced relative to the sleeve 58 by a slight angle (e.g., between about 3° to about 5°), the spool 60 is in a first open position P1 and the first variable orifice A1, formed between the inlet openings 98 of the sleeve and the inlet slots 116 in the spool 60, opens. Referring to FIG. 11, the angular displacement between the spool 60 and the sleeve 58 is linearly represented in the layout in FIG. 11 as angle α. Therefore, fluid from the fluid inlet 26 is communicated to the inlet slots 116 through the first variable orifice A1. Fluid in the inlet grooves 116 is communicated to the first bypass passage 122a in the spool 60 through the first bypass opening 108a in the sleeve 58, which overlaps one of the inlet grooves 116 and the first bypass passage 122a. The fluid in the fluid bypass passage 122a in the spool is communicated to the first control slots 118 through the second annular groove 114.

Referring now to FIG. 12, with the spool 60 further displaced relative to the sleeve 58 (e.g., greater than about 5°), the size of the first variable orifice A1 increases so that more fluid is communicated to the inlet grooves 116 in the spool 60, and the spool 60 moves to the second open position P2. The sixth variable orifice A6, however, closes. While the fluid bypass opening 108a in the sleeve 58 overlaps the fluid bypass passage 122a in the spool 60, the fluid bypass opening 108a does not overlap the inlet groove 116. Therefore, the secondary fluid path 126 is closed.

In one embodiment, the amount of fluid that passes through the secondary fluid path 126 is a function of the size of the fluid bypass opening 108 and distance between the fluid bypass passage 122 and the inlet slot 116 immediately adjacent to the fluid bypass passage 122. Spools 60 and sleeves 58 with different sizes for the fluid bypass opening 108 and different distances between the fluid bypass passage 122 and the inlet slot 116 can be manufactured to account for different fluid motor 18 efficiencies. In one embodiment, a given valve assembly 56 with a given size fluid bypass opening 108 and a given distance between the fluid bypass passage 122 and the inlet slot 116 may be used with fluid motors 18 whose efficiencies differ by less than or equal to about 15%. In another embodiment, the given valve assembly 56 may be used with different fluid motors 18 whose efficiencies differ by less than or equal to about 10%. In another embodiment, the given valve assembly 56 may be used with different fluid motors 18 whose efficiencies differ by less than or equal to about 5%.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

While the best modes for carrying out the invention have been described in detail, those familiar with the art to which this invention relates will recognize various alternative designs and embodiments for practicing the invention within the scope of the appended claims.

The invention claimed is:

1. A steering system configured for attachment to a steering wheel, the steering system comprising:
   a fluid motor;
   a steering unit configured for receiving and expelling fluid;
   wherein the steering unit is in fluid communication with the fluid motor, the steering unit including:
   a fluid meter configured to meter fluid to the fluid motor in response to actuation of the steering unit;
   a valve housing in fluid communication with the fluid meter, the valve housing defining a valve bore; and
   a valve assembly disposed in the valve bore and configured for receiving an input from the steering wheel;
   wherein the valve assembly is moveable between a first open position and a second open position;
   wherein the valve assembly defines a first variable orifice, a second variable orifice, a third variable orifice, and a fourth variable orifice on a primary fluid path to the fluid meter and to the fluid motor from the fluid meter;
   wherein the valve assembly further defines the first variable orifice, the fourth variable orifice, and a bypass orifice on a secondary fluid path to the fluid motor, that bypasses the fluid meter;
   wherein the valve assembly includes:
   a sleeve defining a bore; and
   a spool disposed in the bore of the sleeve;
   wherein the sleeve and the spool cooperate to define the bypass orifice;
   wherein the sleeve and the spool extend about a central longitudinal axis and the spool is configured to rotate about the central longitudinal axis, relative to the sleeve, such that the spool is rotationally displaced, relative to the sleeve, about the central longitudinal axis in response to receiving input from the steering wheel; and wherein the valve assembly moves between the first open position and the second open position in response to an amount of rotational displacement between the spool and the sleeve;

wherein the bypass orifice is open when the valve assembly is in the first open position such that the secondary fluid path is open and fluid is permitted to flow through each of the primary fluid path and the secondary fluid path;

wherein the amount of rotational displacement between the spool and the sleeve is less than or equal to 5 degrees when the valve assembly is in the first open position;

wherein the amount of rotational displacement between the spool and the sleeve is greater than 5 degrees when the valve assembly is in the second open position;

wherein fluid flows through the secondary fluid path in response to input from the steering wheel, as a function of a volumetric inefficiency of the fluid motor; and wherein the bypass orifice is closed when the valve assembly is in the second open position such that the secondary fluid path is closed and fluid is permitted to flow through the primary fluid path and fluid is not permitted to flow through the secondary fluid path.

2. A steering system, as set forth in claim 1, wherein more fluid is permitted to flow through each of the first and fourth variable orifices when the valve assembly is in the second open position than when the valve assembly is in the first open position.

3. A steering system, as set forth in claim 1, wherein fluid is prevented from flowing through the secondary fluid path when there is no input from the steering wheel.

4. A steering wheel, as set forth in claim 1, wherein the bypass orifice is only in the open position when the amount of rotational displacement of the spool, relative to the sleeve, is between 3 degrees and 5 degrees.

5. A steering wheel, as set forth in claim 4, wherein the bypass orifice is only in the open position when the amount of rotational displacement of the spool, relative to the sleeve, is between 3.7 degrees and 5 degrees.

6. A steering unit configured for attachment to a steering wheel and configured to be in fluid communication with a fluid motor, the steering unit comprising:

a fluid meter configured to meter fluid to the fluid motor in response to actuation of the steering unit;

a valve housing in fluid communication with the fluid meter, the valve housing defining a valve bore;

a valve assembly disposed in the valve bore and configured for receiving an input from the steering wheel;

wherein the valve assembly defines a primary fluid path to the fluid meter and to the fluid motor from the fluid meter;

wherein the valve assembly further defines a secondary fluid path to the fluid motor that bypasses the fluid meter, the valve assembly including:

a sleeve including an inner surface opposing an outer surface, wherein the inner surface defines a bore extending along a central longitudinal axis;

wherein the sleeve defines:
a bypass opening;
a first control opening and a second control opening, axially spaced from the first control opening;
a first meter port and a second meter port; and
an inlet opening;
wherein the bypass opening is axially disposed between the second control opening and the first and second meter port;

a spool disposed in the bore of the sleeve and configured to be rotationally displaced relative to the sleeve about the central longitudinal axis to move between a closed position, a first open position, and a second open position in response to input from the steering wheel;

wherein the spool defines:
an inlet slot and a bypass passage;
a first annular groove and a second annular groove; and
a first control slot in fluid communication with the second annular groove;
wherein the first control slot of the spool is configured to provide fluid communication between the second meter port of the sleeve and the first and second control openings of the sleeve when the spool is rotationally displaced, relative to the sleeve;

wherein the spool cooperates with the sleeve to define a first and a fourth variable orifice when the spool is in the first open position;

wherein the bypass opening of the sleeve overlaps with the inlet slot and the bypass passage to define a bypass orifice located on the secondary fluid path when the spool is in the first open position such that fluid flows through the secondary fluid path to the fluid motor, via the first variable orifice, the fourth variable orifice, and the bypass orifice as a function of a volumetric inefficiency of the fluid motor;

wherein the bypass orifice is operatively disposed downstream of the first variable orifice and operatively disposed upstream of the fourth variable orifice such that fluid is prevented from being communicated to the fluid motor prior to input from the steering wheel; and wherein fluid is prevented from flowing through the secondary fluid path to the fluid motor when the spool is not in the first open position.

7. A steering unit, as set forth in claim 6, wherein the spool further defines a second control slot in fluid communication with the first and second control openings of the sleeve when one of the first and second control openings of the sleeve are radially aligned with the second control slots of the spool when the spool is rotationally displaced relative to the sleeve.

8. A steering unit, as set forth in claim 7, wherein the valve assembly further defines a second and a third variable orifice;

wherein the first variable orifice is defined by an overlap between the inlet opening of the sleeve and the inlet slot of the spool;

wherein the second variable orifice is defined by an overlap between the inlet slot of the spool and the first meter port of the sleeve;

wherein the third variable orifice is defined by an overlap between the second meter port defined in the sleeve and the first control slot defined in the spool;

wherein the fourth variable orifice is defined by an overlap between the first control slot defined in the spool and one of the first and second plurality of control openings defined in the sleeve.

9. A steering unit, as set forth in claim 8, wherein the spool is configured to be rotationally displaced relative to the sleeve about the central longitudinal axis to move between the closed position, the first open position, and the second open position in response to input from the steering wheel;

wherein fluid flows through the first variable orifice, the bypass orifice, and the fourth variable orifice to the fluid motor when the spool is in the first open position; and wherein fluid flows through the first, second, third, and fourth variable orifices to the fluid motor when the spool is in the second open position.

10. A steering unit, as set forth in claim 9, wherein the bypass orifice is in the first open position when the rotational displacement of the spool, relative to the sleeve, is less than or equal to 5 degrees; and wherein the first, second, and third variable orifices are only in the second open position when the rotational displacement of the spool, relative to the sleeve, is greater than 5 degrees.

11. A steering unit, as set forth in claim 9, wherein more fluid is permitted to flow through each of the first and fourth variable orifices when the valve assembly is in the second open position than when the valve assembly is in the first open position.

12. A steering unit, as set forth in claim 8, wherein the valve housing defines a first, a second, a third, and a fourth groove in fluid communication with the valve bore;

wherein the first groove is configured to be in fluid communication with the inlet groove of the sleeve such that fluid flows from the first groove and into the sleeve;

wherein the second groove is configured to be in fluid communication with the outlet groove of the sleeve such that fluid flows from the outlet groove and into the second groove;

wherein the third groove is configured to be in fluid communication with the first control opening of the sleeve such that fluid flows from the first control opening and into the fluid motor; and wherein the fourth groove is configured to be in fluid communication with the second control opening of the sleeve such that fluid flows from the fluid motor and into the first control opening.

13. A steering system configured for attachment to a steering wheel, the steering system comprising:

a fluid motor;

a steering unit configured for receiving and expelling fluid;

wherein the steering unit is in fluid communication with the fluid motor, the steering unit including:

a fluid meter configured to meter fluid to the fluid motor in response to actuation of the steering unit;

a valve housing in fluid communication with the fluid meter, the valve housing defining a valve bore; and a valve assembly disposed in the valve bore and defining first, second, third, and fourth variable orifices and further defining a bypass orifice;

wherein the valve assembly defines a primary fluid path and a secondary fluid path and is movable in response to input from the steering wheel between a closed position, a first open position, and a second open position;

wherein the valve assembly includes:

a sleeve defining a bore; and a spool disposed in the bore of the sleeve;

wherein the sleeve and the spool cooperate to define the bypass orifice;

wherein the sleeve and the spool extend about a central longitudinal axis and the spool is configured to rotate about the central longitudinal axis, relative to the sleeve, such that the spool is rotationally displaced, relative to the sleeve, about the central longitudinal axis in response to receiving input from the steering wheel;

wherein the valve assembly moves between the first open position and the second open position in response to an amount of rotational displacement between the spool and the sleeve;

wherein the fluid meter and the second and third variable orifices are disposed on the primary fluid path, between the first and fourth variable orifices;

wherein the bypass orifice is disposed on the secondary fluid path, between the first and fourth variable orifices;

wherein the bypass orifice closed, such that fluid is prevented from flowing through the bypass orifice and through the secondary fluid path, when the valve assembly is in the second open position;

wherein fluid flows through the second variable orifice, the fluid meter, and the third variable orifice, via the primary fluid path to the fluid motor, when the valve assembly is in the second open position;

wherein the bypass orifice is open to allow fluid to flow therethrough, via the secondary fluid path to the fluid motor, when the valve assembly is in the first open position, as a function of a volumetric inefficiency of the fluid motor, such that the fluid meter is bypassed;

wherein the amount of rotational displacement between the spool and the sleeve is less than or equal to 5 degrees when the valve assembly is in the first open position; and wherein the amount of rotational displacement between the spool and the sleeve is greater than 5 degrees when the valve assembly is in the second open position.

* * * * *